US005650563A

United States Patent [19]

Cooper et al.

[11] Patent Number: 5,650,563
[45] Date of Patent: *Jul. 22, 1997

[54] METHOD OF INTRODUCING LEAK DETECTION DYE INTO AN AIR CONDITIONING OR REFRIGERATION SYSTEM INCLUDING SOLID OR SEMI-SOLID FLUORESCENT DYES

[75] Inventors: B. William Cooper, Lloyd Harbor; Ling Lu, Plainview, both of N.Y.

[73] Assignee: Spectronics Corporation, Westbury, N.Y.

[*] Notice: The term of this patent shall not extend beyond the expiration date of Pat. No. 5,650,563.

[21] Appl. No.: 522,245

[22] PCT Filed: Apr. 6, 1995

[86] PCT No.: PCT/US95/04262

§ 371 Date: Sep. 21, 1995

§ 102(e) Date: Sep. 21, 1995

[87] PCT Pub. No.: WO96/07088

PCT Pub. Date: Mar. 7, 1996

Related U.S. Application Data

[63] Continuation-in-part of Ser. No. 297,355, Aug. 29, 1994, Pat. No. 5,440,919.

[51] Int. Cl.⁶ .................................................. G01M 3/20
[52] U.S. Cl. ........................................................ 73/40.7
[58] Field of Search ............................ 73/40.7, 40.5 R; 62/77, 125; 252/68, 301.16, 864

[56] References Cited

U.S. PATENT DOCUMENTS

| | | | |
|---|---|---|---|
| 1,279,679 | 9/1918 | Fear | 8/526 |
| 1,800,693 | 4/1931 | Marshall | 436/3 |
| 1,915,965 | 6/1933 | Williams | 436/3 |
| 1,935,901 | 11/1933 | Augenblick | 8/6 |
| 2,096,099 | 10/1937 | Gaugler | 73/51 |
| 2,260,608 | 10/1941 | Cormack | 62/115 |
| 2,341,430 | 2/1944 | Elsey | 62/170 |
| 2,428,426 | 10/1947 | Lindsay | 312/31.1 |
| 2,506,806 | 5/1950 | Metzger | 62/115 |
| 2,526,938 | 10/1950 | Davis, et al. | 252/408 |
| 2,579,053 | 12/1951 | Schulstadt | 210/131 |
| 2,682,857 | 7/1954 | Reissmann, et al. | 116/114 |
| 2,757,632 | 8/1956 | Wittlin | 116/117 |
| 2,918,033 | 12/1959 | Snyder | 116/114 |
| 2,918,893 | 12/1959 | Norton | 116/114 |
| 2,994,295 | 8/1961 | Newcum | 116/117 |
| 3,006,861 | 10/1961 | Browning, et al. | 252/408 |
| 3,121,615 | 2/1964 | Price et al. | 23/254 |
| 3,323,350 | 6/1967 | Roberts | 73/40.7 |
| 3,370,013 | 2/1968 | Labac | 252/68 |
| 3,770,640 | 11/1973 | Bartlett | 252/68 |
| 3,774,022 | 11/1973 | Dubrow et al. | 240/2.25 |
| 3,785,164 | 1/1974 | Wrenn, Jr. | 62/129 |
| 3,838,578 | 10/1974 | Sakasegawa et al. | 62/125 |
| 3,876,378 | 4/1975 | Montagnon | 23/253 |
| 3,898,172 | 8/1975 | Reif et al. | 252/408 |
| 4,046,507 | 9/1977 | Zweifel et al. | 8/79 |
| 4,072,615 | 2/1978 | McConnell | 210/282 |
| 4,109,487 | 8/1978 | Carr | 62/474 |

(List continued on next page.)

*Primary Examiner*—Michael Brock
*Attorney, Agent, or Firm*—Seidel, Gonda, Lavorgna & Monaco, PC

[57] ABSTRACT

A method of introducing a leak detection dye into a closed refrigeration system through circulation of the refrigerant. A predetermined amount of the leak detection dye, which is soluble in the refrigerant and the system lubricant, is installed in a component of the refrigeration system, such as in a desiccant bag placed in a dehydrator. The leak detection dye may come in various forms including as a leak detection additive having the leak detection dye implanted on and absorbed into a host swatch of a substrate material, as a powder, as a solid pellet of powdered dye concentrate and inert ingredients, or as a slurry. The refrigeration system is assembled, charged and operated, by which the refrigerant and system lubricant flowing through the component, such as a desiccant bag in the dehydrator, and mixes the dye with the refrigerant and system lubricant.

16 Claims, 9 Drawing Sheets

U.S. PATENT DOCUMENTS

| | | | |
|---|---|---|---|
| 4,170,564 | 10/1979 | Brendle | 252/68 |
| 4,187,798 | 2/1980 | Yoshimura | 116/206 |
| 4,348,235 | 9/1982 | Lasswell et al. | 106/33 |
| 4,487,707 | 12/1984 | Holzknecht | 252/68 |
| 4,745,772 | 5/1988 | Ferris | 62/292 |
| 4,758,366 | 7/1988 | Parekh | 252/68 |
| 4,784,959 | 11/1988 | Wegrzyn | 436/3 |
| 4,822,743 | 4/1989 | Wegrzyn | 436/3 |
| 4,938,063 | 7/1990 | Leighley | 73/3 |
| 5,149,453 | 9/1992 | Parekh | 252/68 |
| 5,167,140 | 12/1992 | Cooper et al. | 73/3 |
| 5,167,867 | 12/1992 | Quaife et al. | 252/408.1 |
| 5,251,453 | 10/1993 | Stanke et al. | 62/126 |
| 5,301,537 | 4/1994 | Atkinson | 73/40 |
| 5,440,919 | 8/1995 | Cooper | 73/40.7 |

METHOD OF INTRODUCING LEAK DETECTION DYE INTO AN AIR CONDITIONING OR REFRIGERATION SYSTEM INCLUDING SOLID OR SEMI-SOLID FLUORESCENT DYES

This is a continuation-in-part of application Ser. No. 08/297,355, filed on Aug. 29, 1994, and issued as U.S. Pat. No. 5,440,919, on Aug. 15, 1995.

FIELD OF THE INVENTION

This invention relates generally to the field of detecting leaks in an air conditioning or other refrigeration system and, more particularly, to improved methods of introducing a leak detection dye into the system including the introduction of leak detection dyes into the system in a solid or semi-solid form.

BACKGROUND OF THE INVENTION

There has long been a need to locate leaks in closed refrigeration systems, originally because the loss of refrigerant reduces the cooling capacity of the system, and increasingly because the refrigerants themselves are potential hazardous or deleterious substances when released to the atmosphere. In particular, the production and use of chlorofluorocarbon (CFC) and hydrochlorofluorocarbon (HCFC) refrigerants is scheduled for incremental phaseout, and for recovery and recycling in the interim.

Various methods have been used for detecting and locating leaks in a refrigeration system. Since a slow leak of refrigerant is essentially silent and invisible, such methods have included halide torches, electronic sensors, coating exterior joints with material which reacts with the refrigerant, and injecting various types of dye into the refrigeration equipment to locate sites where the dye exits the system.

One of the most effective methods for detecting leaks in refrigeration systems, and a preferred method to be practiced with the present invention, comprises infusing into the refrigeration system an effective amount of a fluorescent dye compound, dissolved either in the system lubricating oil or in a mixture of the oil and refrigerant. The dye compound circulates with the refrigerant and oil throughout the refrigeration circuit, and is carried out with escaping refrigerant and oil at a leak site. When the refrigeration system is exposed to ultraviolet light, even a small deposit of the dye compound is brilliantly fluorescent to allow visual detection of the leak. U.S. Pat. No. 5,149,453 discloses such a method for detecting leaks in a refrigeration system, and its content is incorporated herein by reference.

When practicing the above method of leak detection with a fluorescent dye, care has to be taken that the fluorescent dye additive is not allowed to contact the exterior of the refrigeration system as the dye is being introduced into the system. If dye additive is inadvertently spilled or rubbed on the exterior of the system, it will be difficult to distinguish between fluorescence from a leak site and that resulting from inadvertent external contact. This is a particular concern where the dye additive is used for quality assurance checks of air conditioners on newly assembled automobiles, as the air conditioning system's final assembly is usually completed in the automobile assembly line, after which the system is charged with refrigerant and leak detection additive, then operated to circulate the additive and reveal any leaks when viewed under ultraviolet light. While care is normally taken to prevent the refrigerant, lubricant and dye from escaping, the nature of the assembly and charging process creates a risk of spills or inadvertent contamination on clothing or tools. Since very low concentration of dye is required to produce fluorescence, any dye, dyed refrigerant or oil spilled or rubbed on the exterior of the air conditioning system may cause false leak indications.

In addition, the number of dyes that can be used are limited to those dyes which are sufficiently soluble in order to allow the dye to be placed in a concentrated liquid. The concentrate liquid is necessary to inject the dye into the refrigeration system. Furthermore, the concentrated liquid must have a sufficient concentration of the dye to be adequately fluorescent under ultra-violet illumination when mixed with the entire refrigeration system.

Consequently, it would be desirable to have a method of introducing leak detection dye into the air conditioning system prior to the initial charging of the system, as this expedient would virtually eliminate any possibility of inadvertent dye contact to the exterior of the air conditioner and allow for increased selection of dyes which can be used.

For that reason, an objective and advantage of the present invention is a method by which the leak detection dye additive is installed in an air conditioning or other refrigeration system before the system is charged with refrigerant. The leak detection dye is released into the refrigerant immediately after the system is charged and operated, in order to reduce the risk of inadvertent contact of the dye on the outside of the system and yet permit quality control leak testing after charging, and remains in the system to permit subsequent leak detection.

Another objective and advantage of the present invention is a method which allows leak detection dye additive to be installed and stored in a component of the air conditioning system well prior to assembly of the complete system.

Another objective and advantage of the present invention is a method to pre-install a specific quantity of dye additive which is proportional to the amount of initial charge of the refrigeration or system lubricant, to ensure that a predictable concentration of dye will be introduced.

Further objects, features and advantages of the present invention, will become apparent to those skilled in the art as the invention is more fully understood by reading the accompanying drawings and detailed descriptions.

SUMMARY OF THE INVENTION

The present invention provides an improved method of introducing a leak detection dye additive into an air conditioning or other refrigeration system. For brevity, the description of the invention is made herein with reference to an air conditioning system, it being understood that it is applicable to other refrigeration systems as well.

A predetermined amount of leak detection additive is installed into a component of an air conditioning system. The leak detection additive is soluble in the refrigerant and the system lubricant. The air conditioning system is assembled including the component containing the predetermined amount of the leak detection additive. The air conditioning system is charged with a refrigerant. The refrigerant circulates in the air conditioning system to release the leak detect additive into the refrigerant and system lubricant.

In another preferred embodiment, a substrate material which is absorbent to the dye additive is cut into a swatch which is shaped according to its intended placement in the system, and a specific amount of the dye additive is placed onto and absorbed into the swatch. For example, in an embodiment intended for use inside a desiccant bag, a swatch of melamine treated polyester felt may be cut to form a circular wafer. The wafer with absorbed additive is inserted into a desiccant bag, and the desiccant bag is then installed in a dehydrator unit of an air conditioning system. When the air conditioning system is assembled from its components, charged with refrigerant, and operated to cycle the refrigerant and system lubricant through the system, the refrigerant and system lubricant flows through the desiccant bag and takes the dye into solution.

In another embodiment, the substrate may be used as a filter component, as for example in a replaceable filter-drier cartridge, or with a solid-core drier. In this embodiment, a woven or fibrous mesh material is cut to the shape of a filter component of the drier, and continues to function as a particle filter after releasing its dye additive into the refrigerant.

In another preferred embodiment, the leak detection additive has a plurality of solid particles wherein the additive has a solubility equal to or greater than 0.1% in a system lubricant. The leak detective additive takes the form of a powder, a pellet or a slurry.

In a preferred embodiment, the leak detection additive is a fluorescent dye compound or composition. The solid particles leak detection dye may be placed in a filter bag wherein the sealed filter bag is inserted into a component of the refrigeration system.

Further objects, features and advantages of the present invention will become more apparent to those skilled in the art as the nature of the invention is better understood from the accompanying drawings and detailed description.

BRIEF DESCRIPTION OF THE DRAWINGS

For the purpose of illustrating the invention, the drawings show a form of the invention which is presently preferred; it being understood, however, that the invention is not limited to the precise arrangement and instrumentality shown.

DESCRIPTION OF THE PREFERRED EMBODIMENTS

Figure 1:
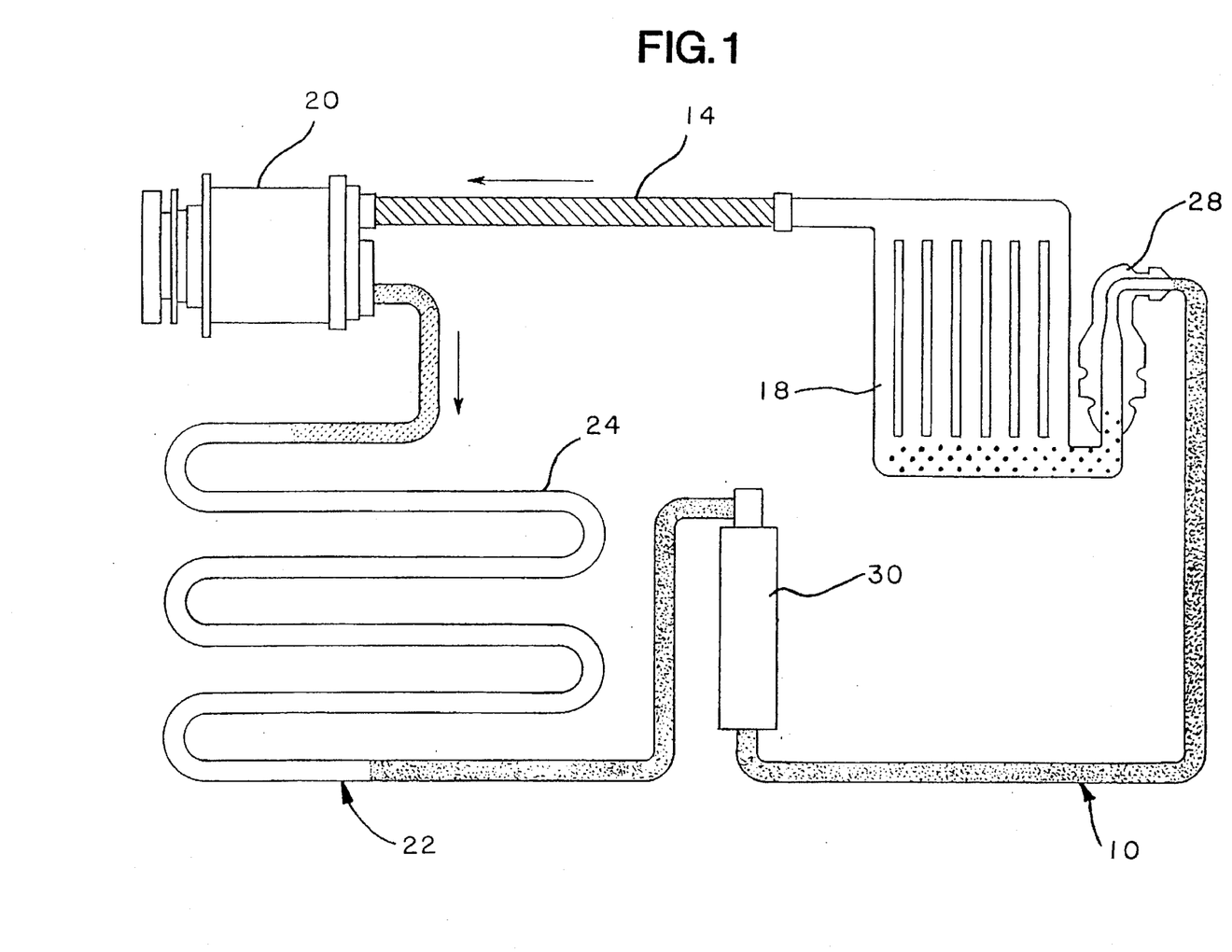
FIG. 1 is a schematic illustration of a basic refrigeration system of an automobile air conditioner, using a receiver-dehydrator between the condenser and evaporator.
Figure 2:
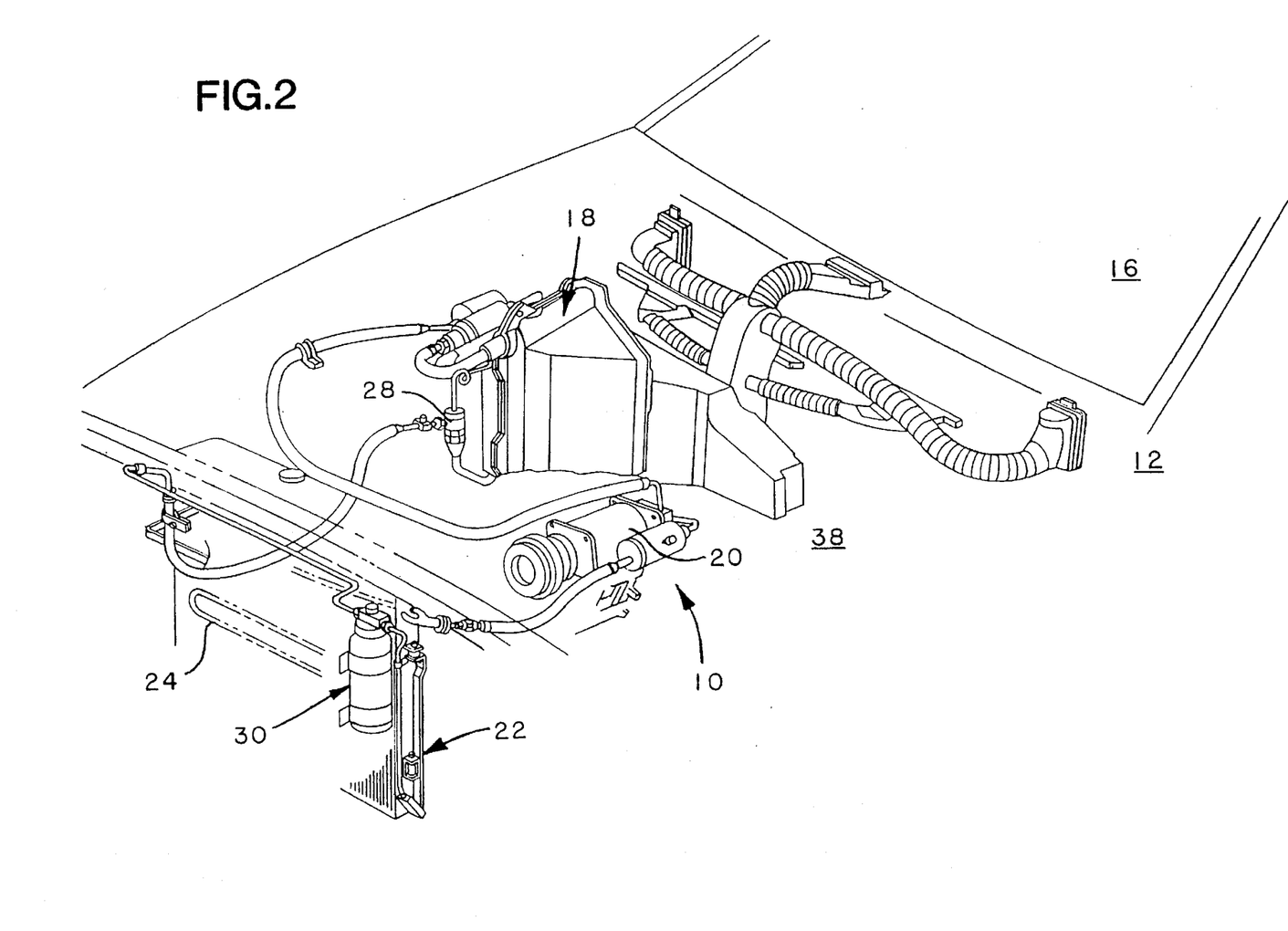
FIG. 2 is a perspective view of an automobile air conditioner system showing the major components as installed in an automobile.

Referring to the drawings in detail, wherein like numerals indicate like elements, FIG. 1 illustrates a basic closed refrigeration circuit 10 of an automobile air conditioner, by which air inside the automobile is cooled and dehumidified. FIG. 2 provides greater detail of the system 10 as it is arranged in an automobile 12.

A refrigerant 14, such as R-12 or more recently R-134a, circulates under pressure in the air conditioning/refrigeration system. In each cycle, the refrigerant is caused to change phase from liquid to gas and back to liquid, absorbing heat from the passenger compartment 16 and releasing heat outside the compartment.

More specifically, the air conditioning system 10 has an evaporator unit 18 where subcooled liquid refrigerant enters and is allowed to expand and absorb heat from warm air of the passenger compartment, causing the refrigerant to vaporize. The warm air of the passenger compartment 16 is connected to the evaporator 18 via ducting, as seen in FIG. 2, such that the cooled and dried air is recirculated into the passenger compartment. After absorbing heat from the passenger compartment, the refrigerant gas is drawn from the evaporator by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releases its heat of condensation, and changes phase back to a hot liquid, still at a high pressure. The refrigerant 14 completes the cycle by passing through a thermostatic expansion valve 28, which meters the high pressure liquid refrigerant 14 as a low pressure spray into the evaporator 18.

Figure 3:
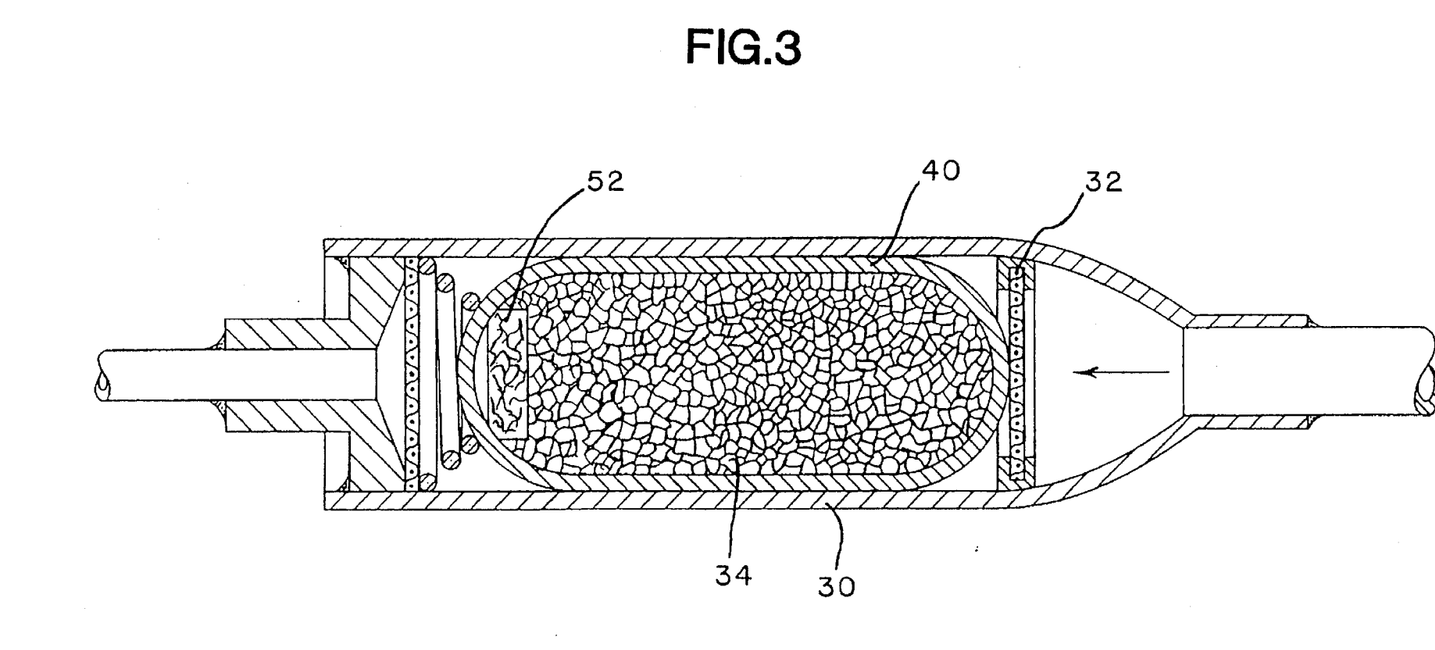
FIG. 3 is a sectional view of a receiver-dehydrator unit having installed therein a desiccant bag containing a dye-wafer according to the invention.

In some systems it is necessary to reservoir the liquid refrigerant before it is metered through the expansion valve because the demand of the evaporator varies under varying conditions. In other systems it is a practice to install an accumulator between the evaporator and compressor so that no liquid can enter the compressor. In either system, water contamination in the refrigerant can cause the water vapor to freeze at the point of expansion, causing refrigerant flow to be blocked, and to react with refrigerants to form acids that may cause internal damage to metal parts. Consequently, in the depicted embodiment a receiver-dehydrator, also referred to as receiver-drier, 30 is located between the condenser 22 and the evaporator 18 to reservoir the refrigerant and remove moisture from it. In other air conditioner systems, an accumulator-dehydrator may be located between the evaporator and compressor to accumulate the refrigerant vapor and remove moisture from it. As shown in FIG. 3, the receiver-dehydrator 30 contains a filter 32 to remove foreign particles and a bag 40 of desiccant material 34 to remove moisture from the circulating refrigerant 14.

Although not depicted, it will be understood by those skilled in the art that desiccant bags are also used in the accumulator of a cycling clutch orifice tube (CCOT) type of automobile air conditioner, and in the Valves-in-Receiver (VIR) assembly of VIR type air conditioners, and may be found in other locations of the refrigerant circuit in other types of refrigeration systems. A dye-additive swatch may be placed in the desiccant bags used with any such system.

As shown in FIG. 2, the air conditioning system components are located in different parts of the engine compartment 38 and attached to various other components of the automobile. Thus, final assembly of the air conditioner usually occurs at the time of its installation into the automobile, and the system cannot be charged with refrigerant until this point. When the air conditioner is assembled and installed in the automobile, the system is evacuated to remove air and moisture prior to charging with refrigerant. The system is charged by releasing refrigerant under pressure from a container through the system service valves to enter the system.

Since the refrigerant is under considerable pressure in a container or service hose, there is a risk of its inadvertent escape and contamination of surroundings. The automobile assembly workers charging the air conditioners typically wear safety goggles, gloves and protective clothing, and use rags to wipe valve fittings. This creates the problem that if the exterior of the air conditioner is contaminated by escaping refrigerant or dye during charging, or by contact with contaminated clothing, the dye additive in the refrigerant will fluoresce under ultra-violet illumination and give false leak indications.

This invention provides a method of introducing a leak detection additive 48 into the air conditioning system before the system is charged with refrigerant, but which will allow the dye to be released and disperse into the refrigerant immediately after the system is charged and circulated.

A dye-containing swatch 52 is produced from a substrate material which is absorbent to the dye additive but which does not react with refrigerant or the system lubricant. In a preferred embodiment for use inside a desiccant bag as described above, a melamine treated 100% polyester felt mat is cut into circular disks or wafers. A metered amount of dye additive is applied to each wafer and allowed to absorb into the material. For this embodiment, the wafer has a circular shape ¾ of an inch in diameter and a thickness of 0.315 inch. The disk is cut such that there are no loose fibers or felt residue from the cutting procedure.

A specific quantity of the dye additive 48 is metered onto the wafer and allowed to absorb into the felt material to form the swatch 52. The amount of dye additive is dependent upon the volume of refrigerant and lubricant that will be introduced into the system, the concentration of dye in the additive, the amount of dye necessary to make leaks visible, and the amount of dye that can exist in the system without adversely effecting its operation.

An alternative to metering the leak detection additive 48 onto the cut disks or wafer is to place the leak detective additive on the substrate such that the substrate is fully saturated with leak detection additive. In this situation, the size of the substrate determines the effective amount of the leak detection additive. The substrate can be cut to the proper size either prior to or after placing the leak detection additive on the substrate.

One preferred leak detection or dye additive is a fluorescent, alkyl substituted perylene dye compound dissolved in an oil which is the same as the system lubricating oil, or which is otherwise compatible with the refrigerant and oil, such as the AR-GLO® and FLUORO-LITE® leak detection additives sold by Spectronics Corporation. This dye is soluble in polyhalogenated hydrocarbon refrigerants and fluoresces a brilliant yellow-green under illumination by long wave ultra-violet light. In an automobile air conditioner system which has a fully-charged capacity of thirty-three ounces of R-134a refrigerant and seven ounces of PAG lubricating oil, an amount of 0.014 ounces of AR-GLO 4/PAG® dye additive is effective to locate leaks without adversely effecting the operation of the system. This amount, plus an additional amount that will remain on the disk, typically 10 percent, is metered onto a disk and allowed to absorb into the disk to create the swatch 52. The tracer swatches 52 are then packaged in quantity (usually 1000) in a sealed moisture-proof bag for shipment to a desiccant bag manufacturer or a receiver-dehydrator manufacturer.

Prior to installing the desiccant material 34 in the receiver-dehydrator 30, a tracer swatch 52 having the leak detection additive 48 is placed into the permeable bag 40, then the particles of desiccant material 34 are added, and the bag is closed to retain the particles.

The desiccant bag 40 is itself then installed in receiver-dehydrator 30. Sealed receiver-dehydrators are shipped to the automobile or engine assembly plant to be installed in the air conditioning system as it is assembled. Upon the air conditioning system 10 being fully connected, it is evacuated and then charged with its initial refrigerant 14. Upon charging and running the system, the dye is mixed with and dissolved in the refrigerant 14 as the refrigerant travels through the desiccant bag 40.

Figure 4:
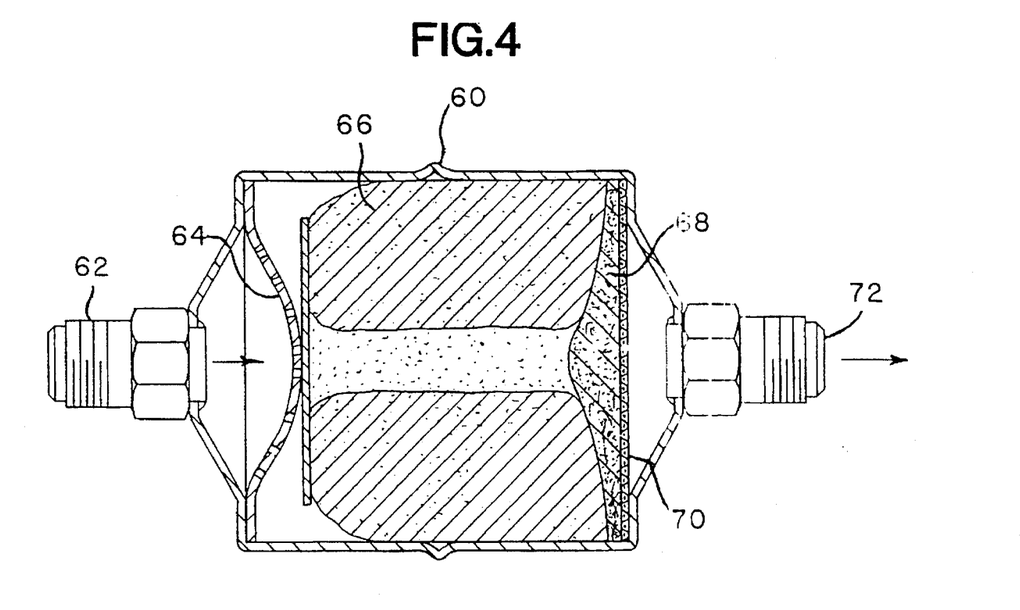
FIG. 4 is a sectional view of an in-line solid core filter-dehydrator with portions of the casing and desiccant core cut away, wherein a dye-absorbed substrate is installed as a filter component.

FIG. 4 shows another embodiment of the invention. An in-line solid core filter-dehydrator 60 may be used in a liquid refrigerant line of an air conditioning system. Circulating refrigeration liquid enters at the inlet side 62, passes through an opening 64 shaped in a solid core of desiccant material 66, through a fine mesh filter material 68 and a screen filter 70, and emerges from the outlet side 72. A substrate of random mesh material which is absorbent to the dye additive, but which does not react with refrigerant, may be used as the filter material 68. Alternatively, a dye-containing substrate of woven or screen-meshed material which is absorbent to the dye additive, but which does not react with refrigerant, may be used as the screen filter 70.

Figure 5:
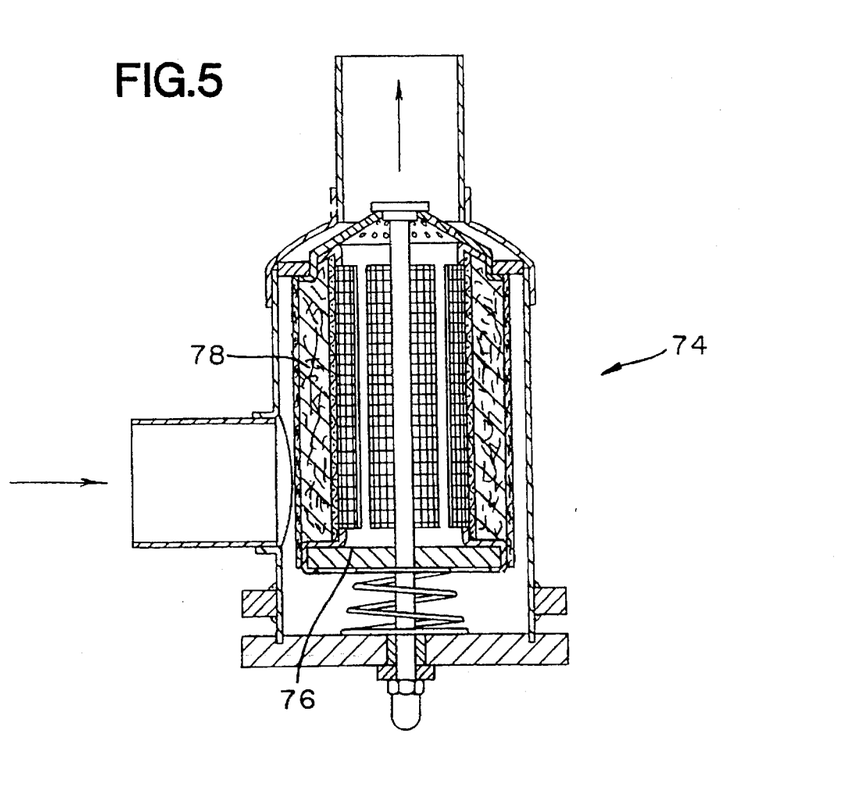
FIG. 5 is a sectional view of a filter-dehydrator with replaceable cartridge, wherein a dye-absorbed substrate is installed as a pre-filter component.

FIG. 5 shows a filter-dehydrator unit 74 with a replaceable cartridge 76. A dye-containing substrate of fabric material, such as polyester felt, may be used as the circumferential filter material 78 surrounding the porous cartridge walls to act as a pre-filter after releasing its dye to the refrigerant.

Other substrate materials, such as natural or synthetic sponge, sintered brass or other metals, or even the desiccant beads may be substituted for those described above. The substrate may have various shapes, and quantities and dimensions may be varied as desired for specific applications.

In the above embodiments, the leak detection dye is added to a component of the system 10 as part of a liquid leak detection additive 48. The additive 48 typically includes a dye compound dissolved in solvents, including the refrigeration lubricant (also referred to as system lubricant). The following embodiments illustrate a leak detection dye 50 being added to the component of to the system 10 as a solid or slurry.

Figure 6:
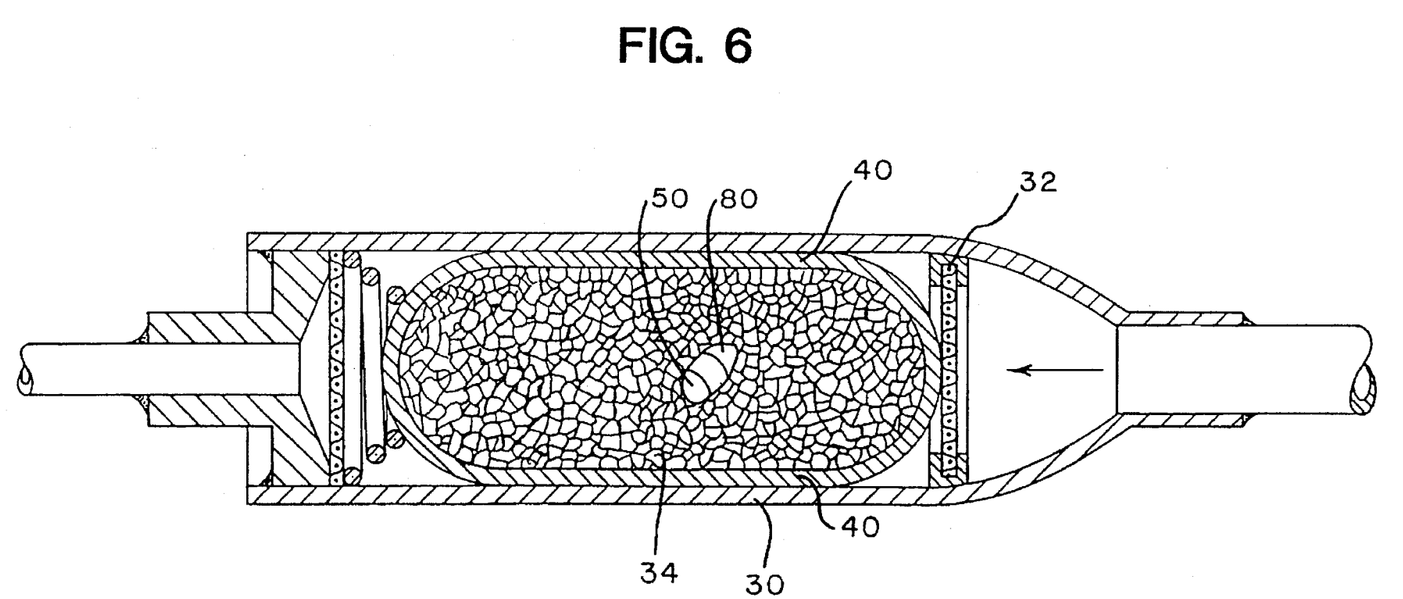
FIG. 6 is a sectional view of a receiver-dehydrator unit having installed therein a desiccant bag containing a dye in pellet form according to the invention.

Referring to FIG. 6, the receiver-dehydrator 30 contains a filter 32 to remove foreign particles, and a permeable bag 40 of desiccant materials 34 to remove moisture from the circulating refrigerant 14. In addition 16 the desiccant materials 34, the permeable bag 40 has a pellet 80 formed of leak detection dye 50. The pellet 80 may also include inert ingredients.

The size of the pellet 80 is selected to provide the proper amount of dye 50 proportional to the volume of refrigerant and lubricant that will be introduced into the system, the concentration of dye necessary to make leaks visible, and the amount of dye that can exist in the system without adversely effecting its operation.

The particles of desiccant material 34 can be added either prior to and/or after the insertion of the pellet 80. The bag 40 is closed to retain both the particles and the pellet 80.

Similarly to the previous embodiments, the desiccant bag 40 is itself installed in the receiver-dehydrator 30. Upon the air conditioner system 10 being fully connected, it is evacuated and then charged with its initial refrigerant 14. Upon charging and running the system, the dye 50 is mixed with and dissolved in the refrigerant 40 as the refrigerant travels to the desiccant bag 40.

It is recognized that the pellet 80 can be placed in other locations in the system 10, such as another component besides the received-dehydrator 30. It is preferred that movement of the pellet 80 through the system be prevented prior to the pellet 80 dissolving into the refrigerant and lubricant.

In contrast to a dye dissolved in liquid leak detection additives 48, a solid dye compound need only have a solubility of 0.1 percent in the system lubricant. In normal liquid leak detection additives, the dye concentrations are in the range typically of 15%–50%, in various solvents, including the system lubricant. While the solubility of the particular dye compound used as a solid dye might be less than that of another dye used in a liquid dye additive, the resulting concentration of dye in the system 10 might be greater.

For example, the amount metered of leak detection additive in a liquid system is typically about 0.03 ounces. If a 25% concentrate of dye in the leak detection additive was used, the total amount of dye would be 0.0075 ounces. If the fully charged system had 10 ounces of system lubricant and a dye with a solubility of 0.1 percent, 0.01 ounces of dye in solid form could be introduced into the system and would go into solution upon charging and circulating the system. Therefore, a lower solubility dye could be used, yet result in a higher dye concentration. While the amount of dye that can be introduced is calculated upon the solubility of the dye in the system lubricant, it should be recognized that the dye needs to also be soluble in the refrigerant.

In a preferred embodiment, the dye is a fluorescent dye which is a solid compound or composition soluble in both the refrigerant and refrigeration or system lubricant. The dyes could be naphthoxanthene, perylene and naphthalene compounds, such as Naphtho{3,2,1-kl}xanthene-2,8-dialkyl 3,9-perylenedialkylacetate 4-alkylamino-n-alkyl-naphthalimide Dinaphtho(1,2,3-cd; 1'2'3-1m)perylene-9,18-dione, alkyl derivatives.

Similar to the liquid dyes, the fluorescent solid dye must be stable at operating temperatures of the A/C or refrigeration system, and should not change the properties of the refrigerant or the system lubricant or adversely effect components and parts of the system.

Figure 7:
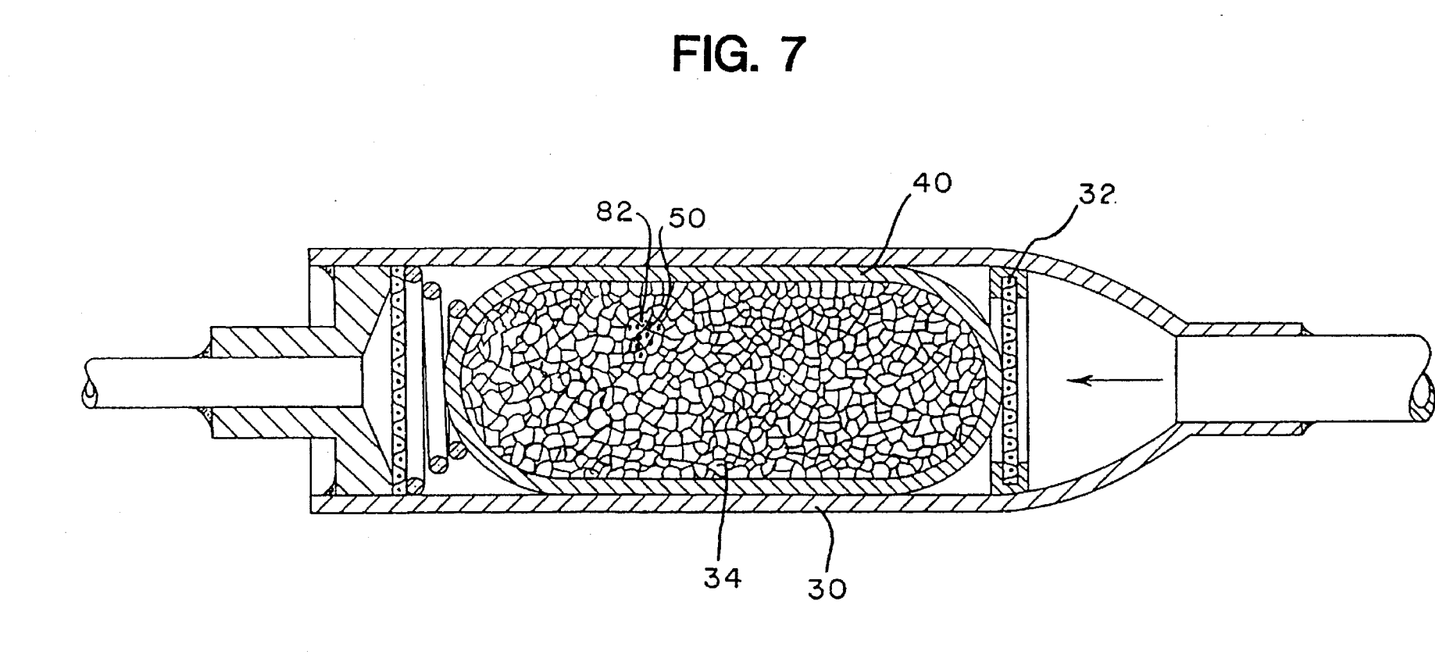
FIG. 7 is a sectional view of a receiver-dehydrator unit having installed therein a desiccant bag containing a dye in powder form according to the invention.

Referring to FIG. 7, a leak detection dye 50 in a powder form 82 is added to the permeable bag 40 along with the particles of desiccant material 34. The sealed permeable bag 40 is installed in the receiver-hydrator 30. The dye 50 in powder form 82 dissolves into the system 10 as the system 10 is charged.

Figure 8:
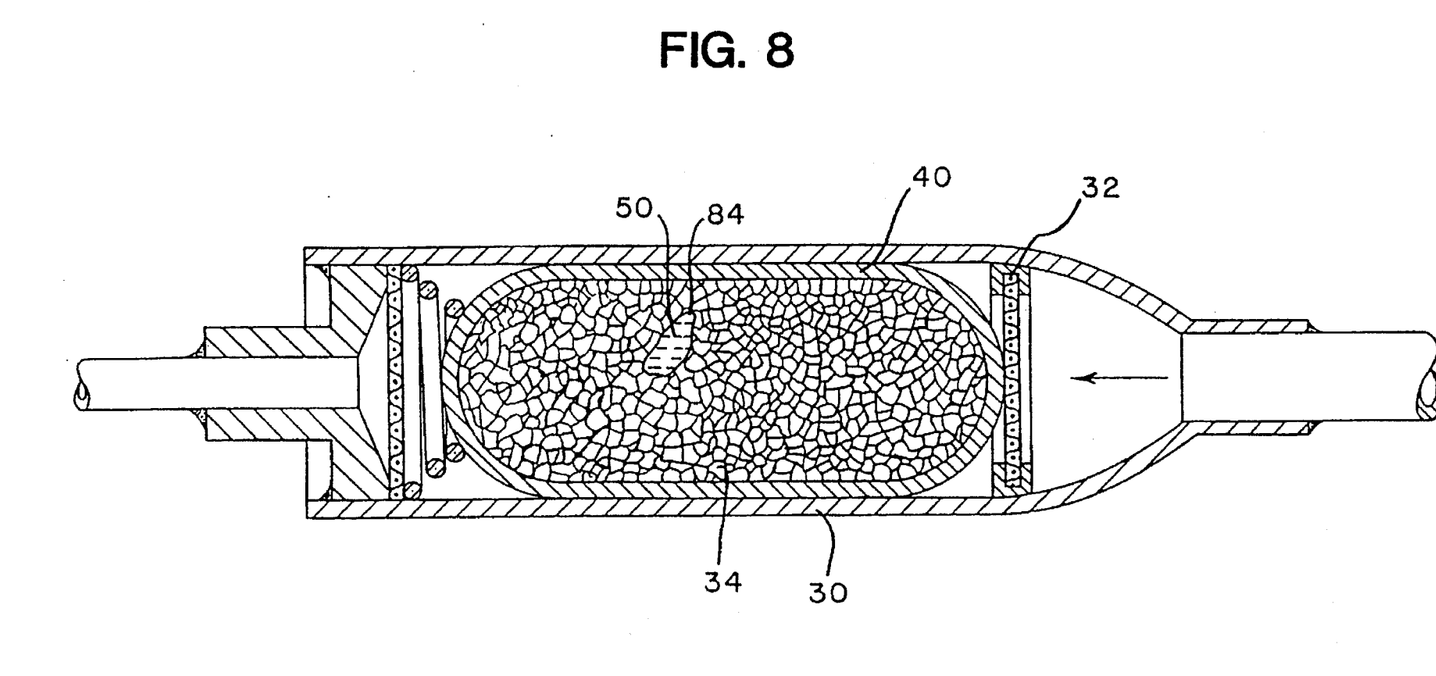
FIG. 8 is a sectional view of a receiver-dehydrator unit having installed therein a desiccant bag containing a dye in slurry form according to the invention.

Referring to FIG. 8, the receiver-dehydrator 30 is shown having a leak detection dye 50 in a slurry form 84. The slurry form 84 could include inert ingredients. The dye 50 in both the powder form 82 and the slurry form 84 is installed in a quantity dependent on the factors listed above with respect to the swatch 52 and the pellet 80.

In an embodiment using naphthalimide dye in a system having seven (7) ounces of PAG lubricant oil with a desired 375:1 dilution ratio and the naphthalimide having a 25% colorant, 0.0187 ounces of liquid dye additive would be required and only 0.0047 ounces (volume) of powder dye would be required. The powder dye could be added directly with the particles of desiccant material 34 to the permeable bag 40 as in FIG. 7. In the alternative, the powder dye could be mixed with a sufficient quantity of inert binding agent to form a convenient sized tablet as in FIG. 6. Another alternative is to mix the naphthalimide dye powder with a sufficient quality of the PAG lubricant to form a slurry. The slurry mixture could be added directly into the permeable bag 40 as in FIG. 8.

Figure 9:
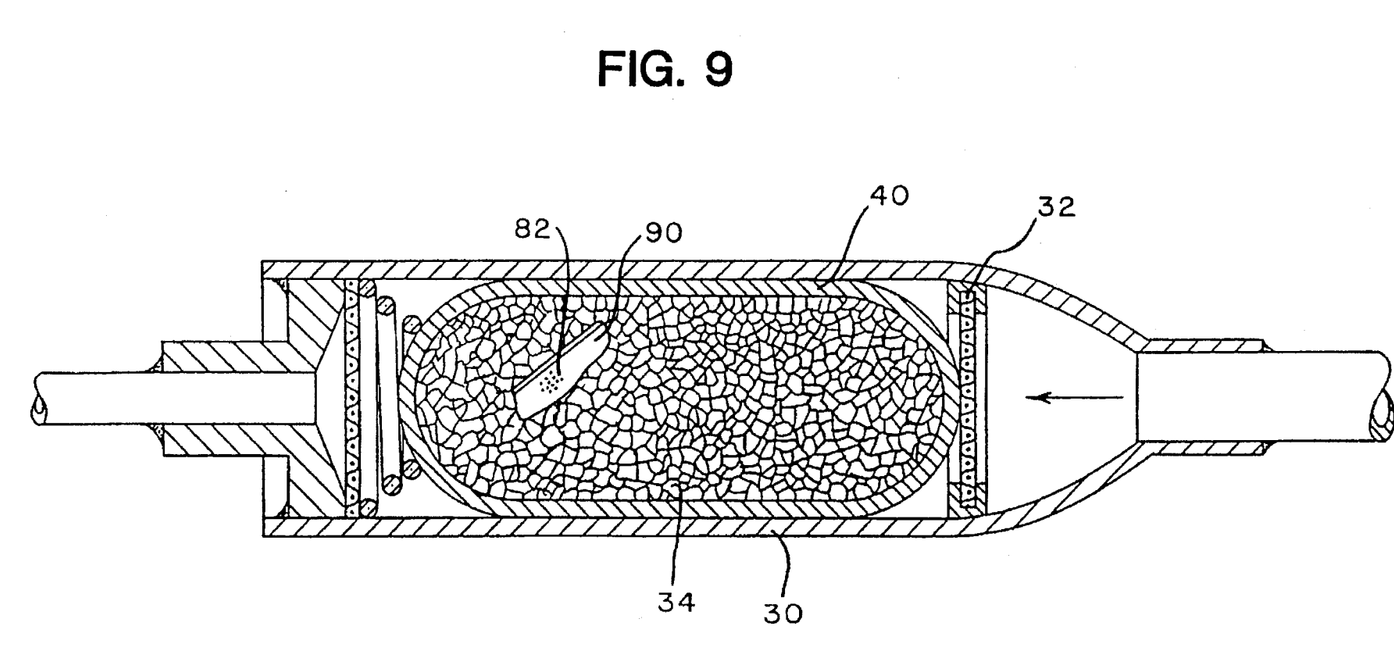
FIG. 9 is a sectional view of a receiver-dehydrator unit having installed therein a desiccant bag containing a dye in powder form in a filter bag according to the invention.

Referring to FIG. 9, an alterative embodiment to installing the leak detection dye 50 into the permeable bag 40 is to place the leak detection dye 50 such as in the powder form 82 into a filter bag 90. The filter bag 90 is sealed and then placed into the permeable bag 40 along with the particles desiccant material 34. It is recognized that the filter bag 90 can be placed in other components of the system 10.

Figure 10:
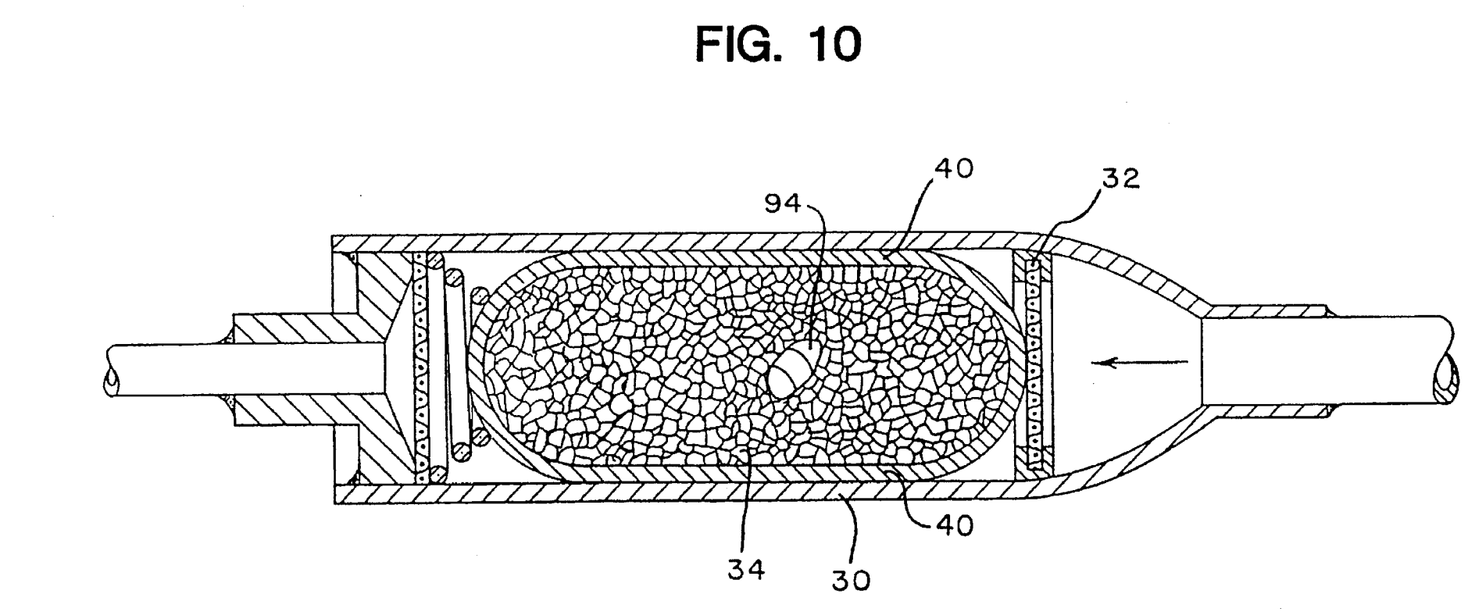
FIG. 10 is a sectional view of a receiver-dehydrator unit having installed therein a desiccant bag containing a dye in powder form in a capsule according to the invention.

Referring to FIG. 10, an alterative embodiment to installing the leak detection dye 50 into the permeable bag 40 is to place the leak detection dye 50 such as in the powder form 82 into a capsule 94. The capsule 94 is placed into the permeable bag 40 along with the particles desiccant material 34. The capsule 94 is formed of inert ingredients which dissolve in the system lubricant upon charging the system 10 without adversely effecting the operation of the system 10. It is recognized that the capsule 94 can be placed in other components of the system 10. Furthermore, it is recognized that the capsule 94 could contain the dye 50 in solid or slurry form also.

The invention may be embodied in other specific forms without departing from the spirit or central attributes thereof. Various dye additives may be used, in particular, additives prepared from a fluorescent alkyl-substituted naphthalimide dye compound which fluoresce bright green under long-wave ultraviolet irradiation. Accordingly, reference should be made to the claims, rather than to the foregoing specification, as indicating the scope of the invention.

What is claimed is:

1. A method of introducing a leak detection additive into a refrigeration system in which a refrigerant and a system lubricant are circulated, comprising the steps of:

installing a predetermined amount of a leak detection additive, which is soluble in the refrigerant and the system lubricant in a dehydrator component of the refrigeration system through which refrigerant circulates when the system is assembled and operated;

assembling the refrigeration system to include the dehydrator component;

charging the refrigeration system with a refrigerant; and circulating the refrigerant in the refrigeration system to release the leak detection additive into the refrigerant and the system lubricant.

2. A method as in claim 1, wherein the step of installing the leak detection additive in a dehydrator component of the refrigeration system is performed by the sub-steps of:

inserting the leak detection additive in a desiccant bag, and inserting the desiccant bag in a dehydrator component of the refrigeration system where water is removed from the refrigerant.

3. A method of introducing a leak detection additive into a refrigeration system in which a refrigerant and a system lubricant are circulated, comprising the steps of:

providing a substrate of material which is capable of absorbing and releasing a leak detection additive;

fully saturating the substrate with leak detection additive, which is soluble in the refrigerant and the system lubricant, and allowing the additive to absorb into the substrate;

sizing the substrate to contain an effective amount of the leak detection additive;

installing the additive-absorbed substrate in a component of the refrigeration system through which refrigerant circulates when the system is assembled and operated;

assembling the refrigeration system to include the component containing the additive-absorbed substrate;

charging the refrigeration system with a refrigerant; and circulating the refrigerant in the refrigeration system to release the leak detection additive into the refrigerant and the system lubricant.

4. A method as in claim 3, wherein the substrate is cut to the proper size prior to placing the leak detection additive on the substrate.

5. A method as in claim 3, wherein the substrate is cut to the proper size after placing the leak detection additive on the substrate.

6. A method of introducing a leak detection additive into a refrigeration system in which a refrigerant and a system lubricant are circulated, comprising the steps of:

providing a leak detection additive having at least a plurality of solid particles;

installing the leak detection additive in a dehydrator component of the refrigeration system through which refrigerant circulates when the system is assembled and operated;

assembling the refrigeration system to include the component containing the leak detection additive;

charging the refrigeration system with a refrigerant; and circulating the refrigerant and the system lubricant in the refrigeration system to dissolve the leak detection additive including the particles in the refrigerant and the system lubricant therein releasing the leak detection additive into the refrigerant and the system lubricant.

7. A method as in claim 6, wherein the step of installing the substrate in a dehydrator component of the refrigeration system is performed by the sub-steps of:

inserting the leak detection additive in a filter bag;

sealing the filter bag; and inserting the filter bag in a dehydrator component of the refrigeration system.

8. A method as in claim 6, wherein the leak detection additive is in a pellet form and the solid particles form the pellet.

9. A method as in claim 8, wherein the pellet comprises a powdered dye concentrate and inert ingredients.

10. A method as in claim 8, wherein the pellet consistent essentially of powdered dye concentrate.

11. A method as in claim 6, wherein the leak detection additive is in slurry form.

12. A method as in claim 6, wherein the leak detection additive is in powder form.

13. A method as in claim 6, wherein the leak detection additive includes a fluorescent dye compound which is soluble in the refrigerant and system lubricant.

14. A method as in claim 13, wherein the dye compound comprises a fluorescent, alkyl substituted perylene dye.

15. A method as in claim 13, wherein the dye compound comprises a fluorescent, alkyl substituted naphthalimide dye.

16. A method as in claim 6, wherein the step of installing the substrate in a dehydrator component of the refrigeration system is performed by the sub-steps of:

inserting the leak detection additive in a capsule, the capsule being inert and soluble in the system lubricant; and inserting the capsule in a dehydrator component of the refrigeration system.

* * * * *

UNITED STATES PATENT AND TRADEMARK OFFICE
CERTIFICATE OF CORRECTION

PATENT NO. : 5,650,563
DATED : July 22, 1997
INVENTOR(S) : B. William Cooper, et al.

It is certified that error appears in the above-indentified patent and that said Letters Patent is hereby corrected as shown below:

Face page, under the heading "[*] Notice:", change "5,650,563" to --5,440,919--.

Signed and Sealed this

Thirtieth Day of September, 1997

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,650,563
DATED : July 22, 1997
INVENTOR(S) : B. William Cooper, et al.

It is certified that error appears in the above-indentified patent and that said Letters Patent is hereby corrected as shown below:

Claim 10 change "consistent" to --consists--.

Signed and Sealed this

Twenty-fifth Day of November, 1997

Attest:

BRUCE LEHMAN

*Attesting Officer*  *Commissioner of Patents and Trademarks*